SYNCHRONOUS TRANSMITTER-RECEIVER

Original Filed Aug. 25, 1960 6 Sheets-Sheet 1

INVENTORS
ROY J. SMITH
LAWRENCE A. TATE

BY [signature]

ATTORNEY

April 2, 1968 R. J. SMITH ET AL 3,376,385

SYNCHRONOUS TRANSMITTER-RECEIVER

Original Filed Aug. 25, 1960 6 Sheets-Sheet 6

United States Patent Office 3,376,385

Patented Apr. 2, 1968

3,376,385

SYNCHRONOUS TRANSMITTER-RECEIVER

Roy J. Smith, Wappingers Falls, and Lawrence A. Tate, Poughkeepsie, N.Y., assignors to International Business Machines Corporation, New York, N.Y., a corporation of New York Original application Aug. 25, 1960, Ser. No. 51,956, now Patent No. 3,208,049, dated Sept. 21, 1965. Divided and this application May 15, 1964, Ser. No. 367,642

11 Claims. (Cl. 178—69.5)

This invention, which is a division of copending application Ser. No. 51,956, filed Aug. 25, 1960, issued Sept. 21, 1965 as Patent No. 3,208,049 relates to transmission of data and particularly to high speed transmission of encoded digital data over telephone, high speed telegraph or radio circuits.

Expanding industries are finding a greater need for computer systems in the transaction of business at geographically separated locations. The computer field is presenting these industries with more efficient means for conducting their business. The need often arises for the transmission of stored recorded data from one location to another. This data, in the form of records or computer outputs, is presented in digital form giving rise to a compatability with existing transmission facilities.

It is a general object of this invention to enable rapid and accurate transfer of records consisting of digital data from a storage device at one location to a storage device at another location by employing transmission facilities.

It is another object of this invention to provide rapid and accurate transfer of stored binary data either on a half-duplex mode or full-duplex mode of operation.

It is an additional object of this invention to provide synchronization between a transmitter and receiver without the need for synchronization bits in addition to data bits transmitted over transmission facilities.

Another object of this invention is to provide means for selectively lengthening, shortening or maintaining the period between generated pulses used for sampling received signals from a transmission medium.

These and other objects are attained with the invention which is capable of full-duplex or half-duplex operation. By way of introduction as to the various functions which may be performed by the invention, a half-duplex arrangement will be discussed.

The invention, hereinafter referred to as the Synchronous Transmitter-Receiver, accepts record data in the form of multi-bit binary characters from an input device. After translation to a transmittal code, the Transmitter-Receiver places the transmittal code a bit at a time on a transmission medium through suitable modulation equipment. At a receiving station, the serially received bits are demodulated and presented to the Transmitter-Receiver a bit at a time for forming a complete multi-bit character. When a complete character is received, the character is suitably translated to an output code for presentation to an output device which is to receive the record being transmitted.

Synchonization of the receiving Synchronous Transmitter-Receiver (STR) is maintained without the use of separate synchronizing pulses from the transmitter. Synchronization must be maintained, in that each character transmitted has meaning only because of the time position arrangement of the individual bits within the character. The invention discloses a synchronizing means whereby synchronization is maintained at the receiving STR by utilizing only the data bits transmitted by the transmitting STR. The receiving STR generates a sampling strobe pulse which must be generated and maintained as near as possible at the center of received bits. Means are provided at the receiving STR for indicating the position of the strobe pulse with respect to the center of received data bits. A count of the time between the start of a received bit and the occurrence of the sample strobe pulse is added to a count of the time between the fall of the received signal and the next following sample strobe pulse. This count is compared with a standard, and after three successive indications of a deviation from the standard, the sample strobe pulse is caused to be retarded or advanced from its normal occurrence thereby maintaining the pulse as near as possible at the center of received signals.

The synchronization means mentioned previously also includes a means controlling the rate at which bits are transmitted. In full-duplex operation, each STR controls its own transmitted bit rate, and thus controls the synchronization of the other STR receiving unit. In half-duplex operation, the record transmitting STR will control the transmitting bit rate of data characters and of reply characters from the record receiving STR. The receiving STR will be synchronized in accordance with the means previously discussed. The record receiving STR in half-duplex operation will be called upon to send certain reply information in the form of transmitted control characters. Means must be provided insuring that the reply characters will be received by the record transmititng STR in synchronism so they will be recognized in their proper time position relationship. In half-duplex operation, the transmitting bit rate of the receiving STR will be adjusted by the receiver bit sampling strobe pulse generating means. In this mnaner, the oscillator of the record transmitting STR will control the record transmitting bit rate, will provide the synchronization of the record receiving STR bit sampling strobe, and will in turn control the transmitting bit rate of the record receiving STR when it is called upon to send a reply. The bit sampling strobe pulse of the receiving section of the record transmitting STR will be tied to the oscillator controlling the transmitting bit rate. A single oscillator, therefore, in the record transmitting STR controls the transmitting bit rate, the record receiving STR bit sample strobe, the record receiving STR reply bit rate and the record transmitting STR receiver sampling strobe pulse.

The foregoing and other objects, features and advantages of the invention will be apparent from the following more particular description of a preferred embodiment of the invention, as illustrated in the accompanying drawings.

Figure 6:
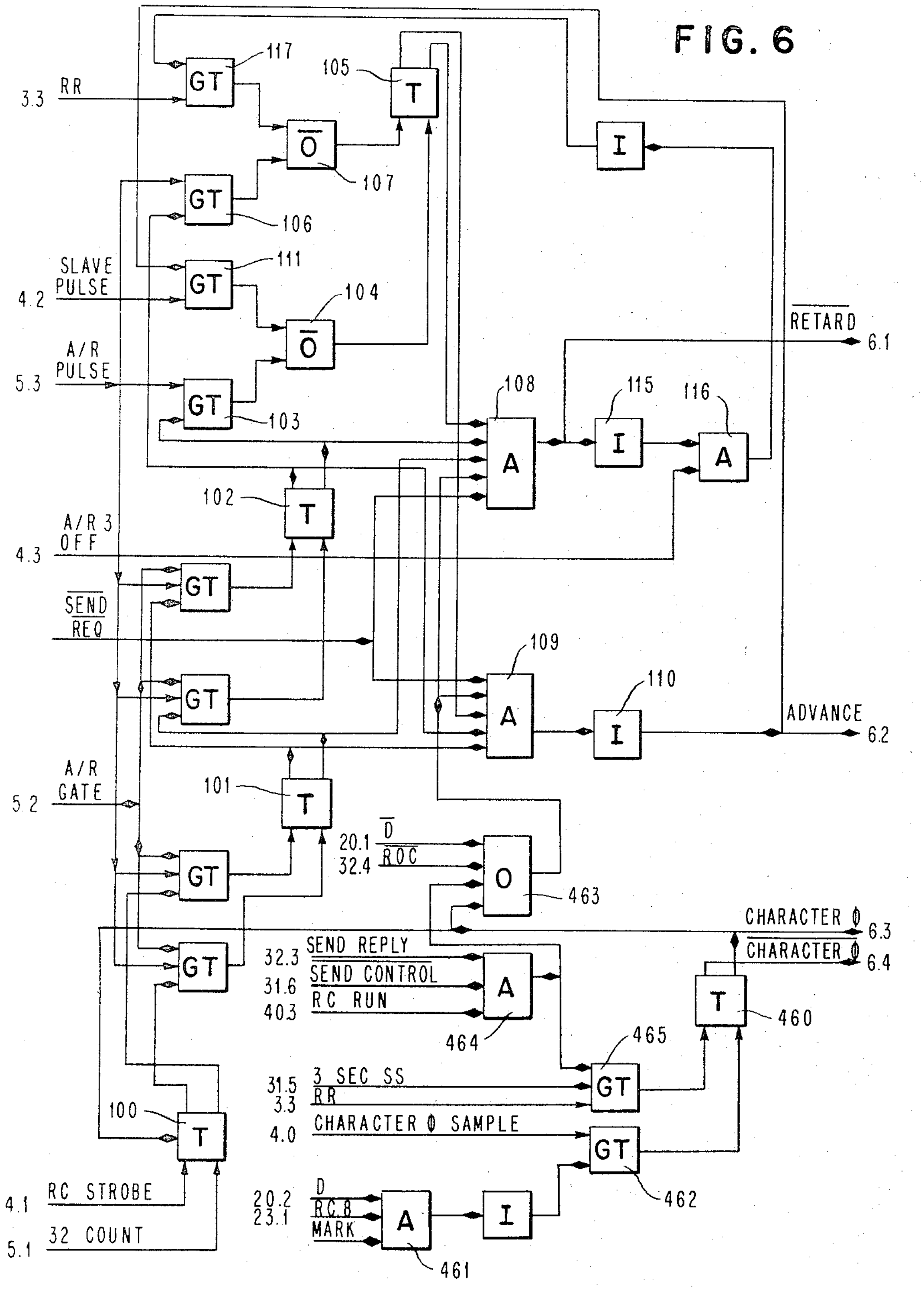
FIG. 6 is a logical block diagram showing the means responsive to the phase counter of FIG. 5 for indicating three successive deviations of a receive strobe from the center of a received signal.
Figure 7:
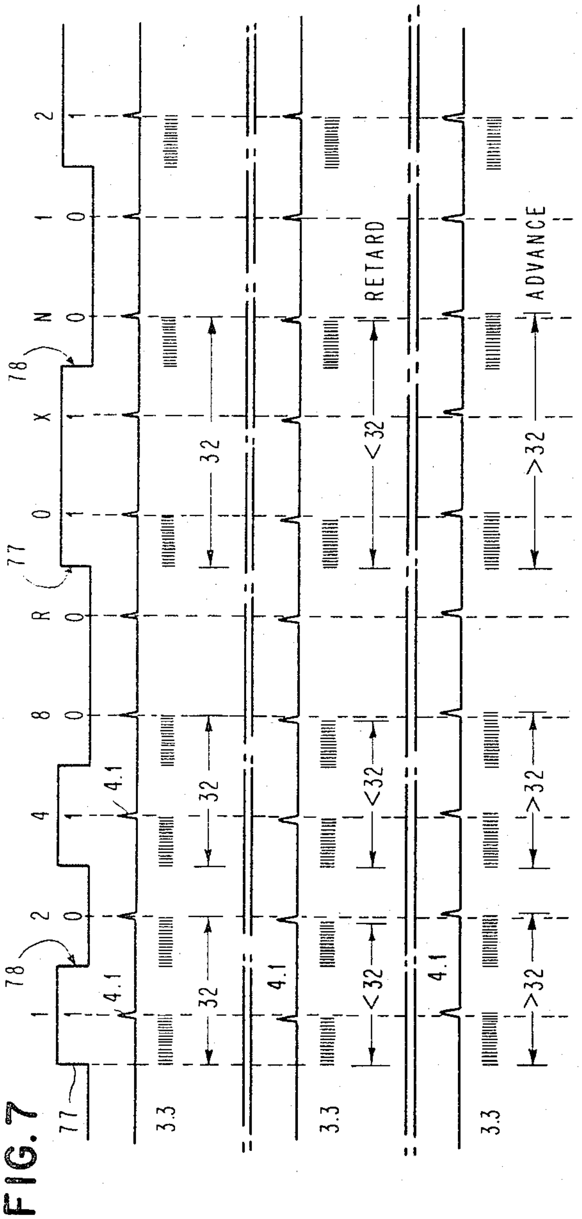
FIG. 7 is a diagram showing a series of received signals of a multi-bit, time-position coded character with an indication of the operation of the phase counter of FIG. 5.
Figure 7A:
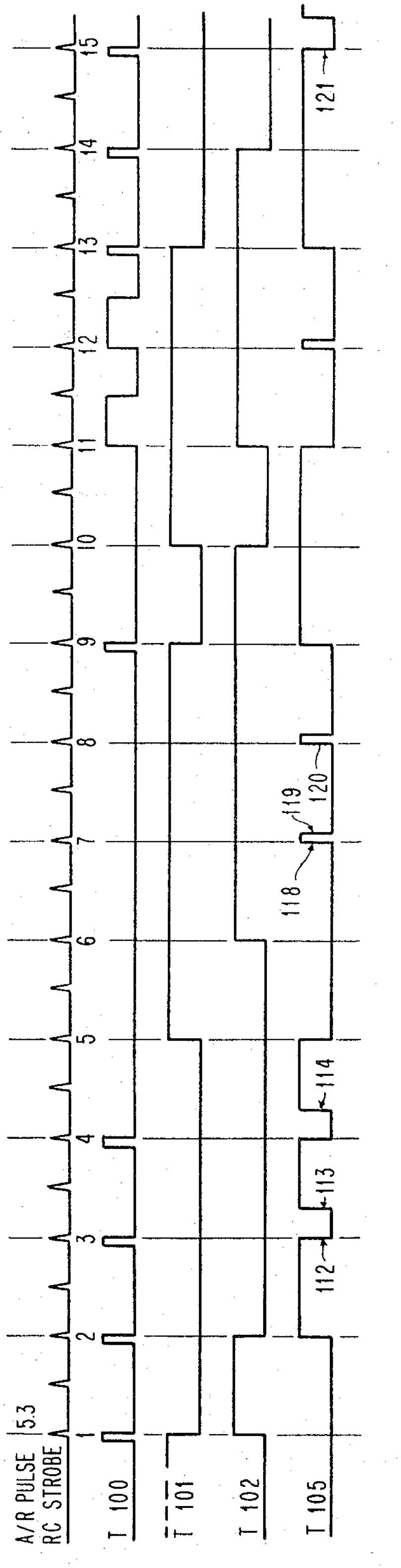

FIG. 7*a* is a diagram showing representative responses of the phase counter responsive means of FIG. 6;

FIG. 8 is a timing diagram showing the waveforms generated by the receive strobe generating means of FIG.

Figure 9:
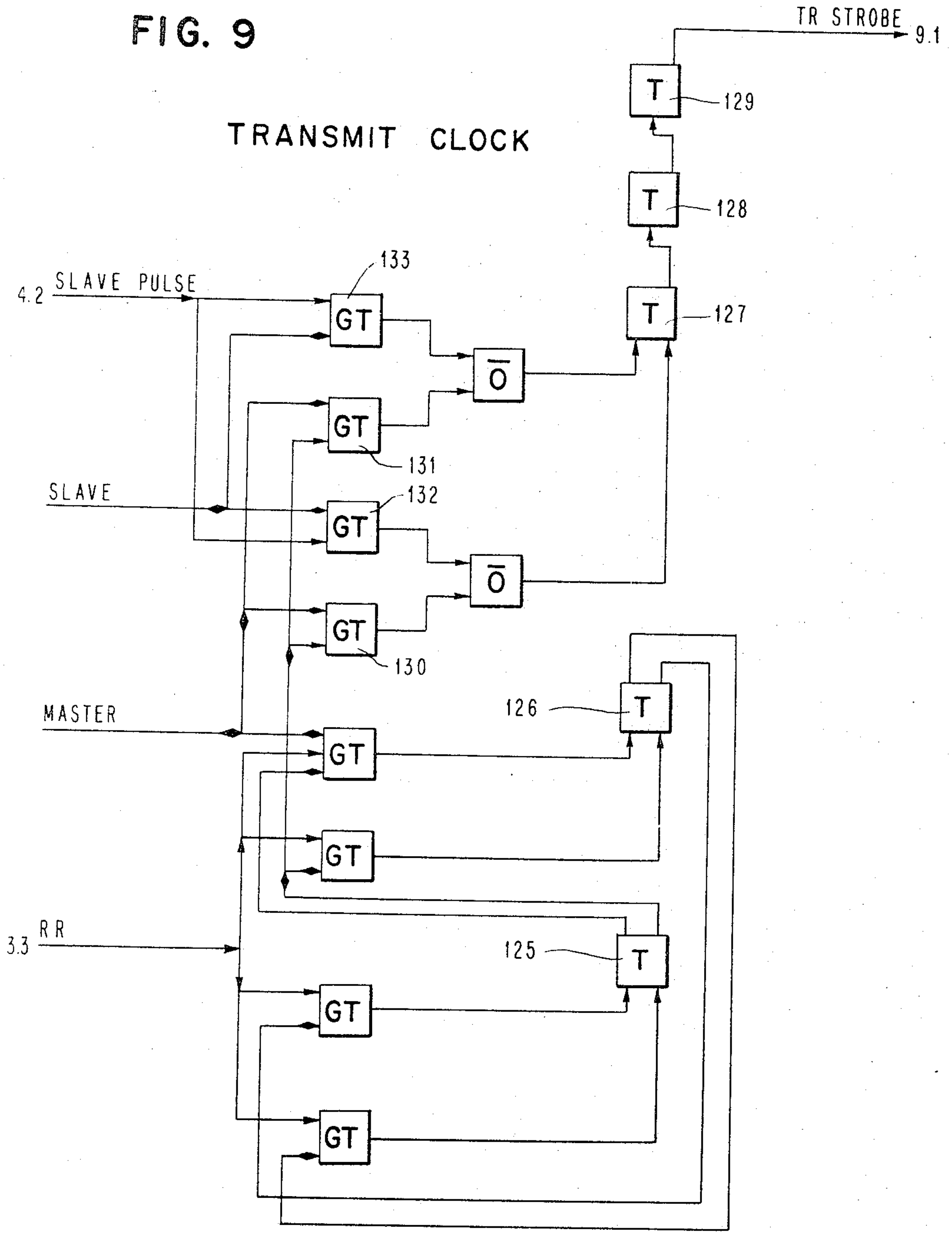

4 when the receive strobe is caused to be advanced or retarded;

FIG. 9 is a logical block diagram showing the means for generating a transmit strobe which controls the transmitted bit rate.

Before starting a detailed description of the invention, the operation of the logic blocks will be explained and certain of the abbreviations used in the drawings and description will be identified.

The logic blocks will be explained first with the symbols used and the inputs and outputs concerned.

A—AND Circuit wherein when all inputs are at a positive level, and output will be at a negative level.

O—OR Circuit wherein when any input is at a negative level, the output will be at a positive level.

GT—GATE Circuit wherein when all inputs are positive, the output will be positive.

$\overline{O}$—OR Circuit wherein if any one input is positive, the output will be positive, such as the required positive input pulse to triggers (T), or if any one input is negative, the desired output will be negative, such as the required negative input to latch circuits (LT).

T—TRIGGER Circuit wherein a positive pulse to the bottom right side of the block will turn the trigger on producing a positive level at the upper right output and a negative level at the upper left output or a positive pulse input to the lower left side will produce a positive level at the upper left side and a negative level at the upper right side.

LT—LATCH Circuit wherein a negative pulse input to the bottom right or bottom left side will produce a positive level at the upper right or upper left side respectively.

I—INVERTER Circuit wherein a positive input is inverted to a negative output or a negative input is inverted to a positive output.

Output lines in the drawings have been labeled and identified by indicating the figure number before the decimal point and a number after the decimal point indicating the position of the output line in the figure. As an example, the RC Strobe pulse has been identified as such and has been given a numeral designation of 4.1 indicating that the pulse originates from FIG. 4 and is the first output at the top of the figure. Input lines which enter from the left of each figure are identified as to their source. Arrows and diamond heads indicate circuit connections. Arrow heads indicate a pulse type of input and diamond heads indicate a voltage level.

When reference is made to a transmitting STR, this is the STR which is being utilized to transmit data characters of a record from an input device. A receiving STR is receiving data characters of a record for presentation to an output device. It must be remembered that a receiving STR is also capable of transmitting control characters when called for and that a transmitting STR may receive control characters.

Figure 1:
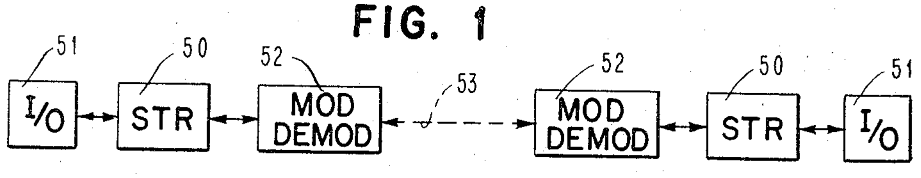
FIG. 1 is a simplified block diagram showing the place of a Synchronous Transmitter-Receiver (STR) in a record transmission system.

FIG. 1 depicts the place of the Synchronous Transmitter-Receiver (STR) in a transmission system. The STR 50 accepts characters of a variable length record from an Input/Output Device 51 or a modulator-demodulator 52 and is capable of presenting data in the form of multi-bit characters to either the input/output device 51 or the modulator-demodulator 52 for transmission over a medium 53.

Figures 2, 4:
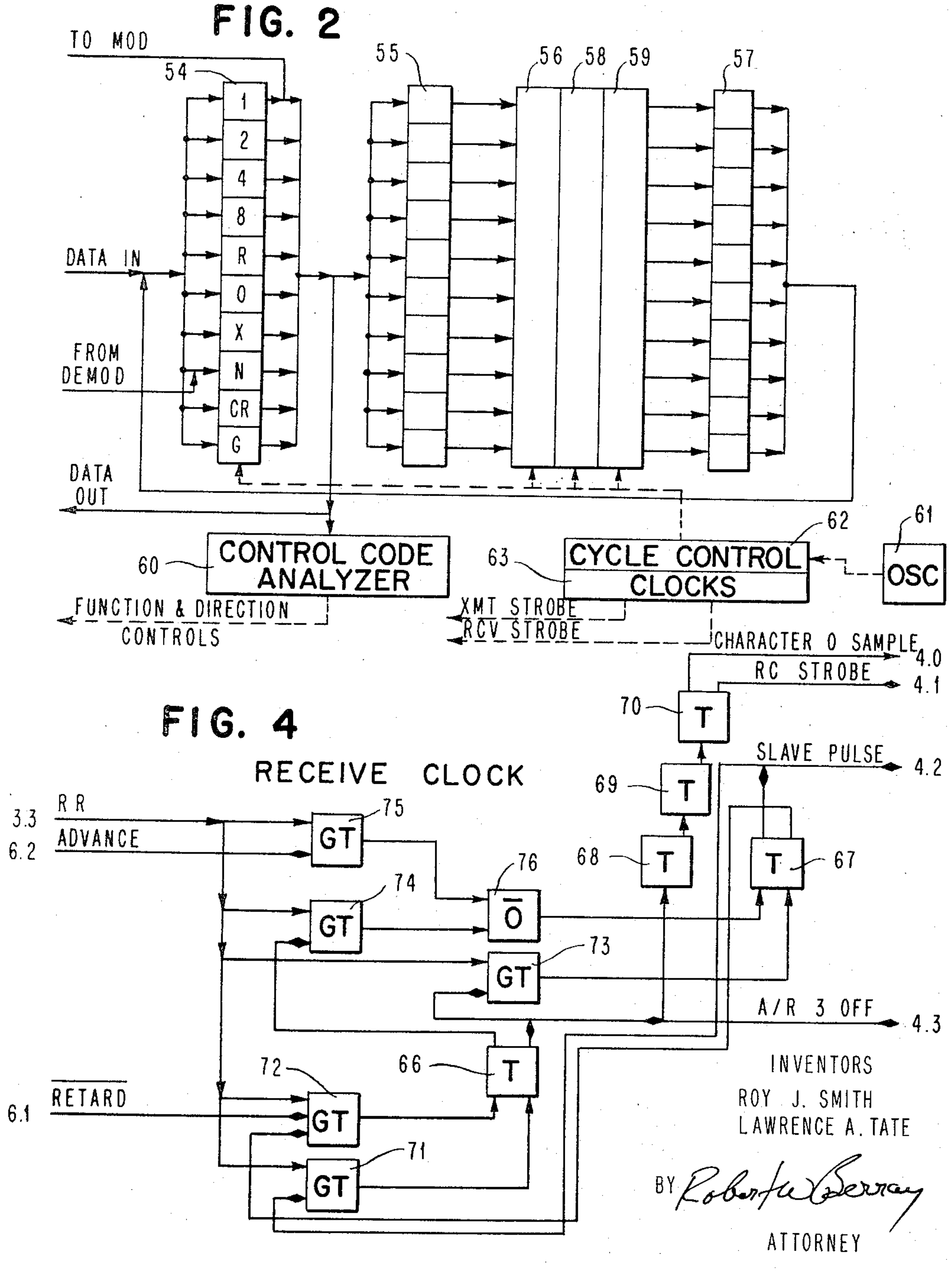
FIG. 2 is a block diagram showing information flow and control between major parts of the STR.
FIG. 4 is a logical block diagram of the receiver clock in the STR for generating a receiver strobe pulse.

The major portions of the STR are shown in block form in FIG. 2. Probably the most heavily worked area of the STR is the multistage register 54. Data bits which make up a character are entered into the register positions identified as 1, 2, 4, 8, R, O, X, N. The remaining two positions designated CR and G are utilized for certain control functions. The data input from an input device is entered in parallel form, a character at a time and in the preferred embodiment of the invention is a character of 7 bits. The input character is then read out of register 54 through a corresponding plurality of core drivers 55 to a transmit translator core plane 56. The translated input character is read out from the translator 56 through a corresponding plurality of sense amplifiers 57 back to the register 54. The transmit translator 56 is effective to translate the 7 bit input code to a transmission code which contains 4 out of 8 data bits. The data bit contained in position 1 of the register 54 is then presented to the modulating equipment for transmission.

After transmission of the first bit of information from the register 54 the transmittal code is then read out through the core drivers 55 to a housekeeping core plane 58 containing a temporary storage register for the remainder of the transmittal character. On the next transmit cycle, the housekeeping core plane temporary storage means is read out through the sense amplifiers 57 to the register 54. The temporary storage means within the housekeeping plane 58 is operative to shift all the data bits in the transmittal character to the next preceding register position. Thus, the data bit originally placed in register position 2 will have been shifted to register position 1 for transmission by the modulating equipment. The entire transmittal character is thus shifted through the register 54 for transmission. Register position CR is the "tag" position which was set to a predetermined stable state when the translated character was originally read from the transmit translator 56. As the transmittal character is shifted out of the register 54, the tag bit will eventually be shifted to register position 2 at which time a sample of the predetermined stable state of register position 2 and an opposite stable state of the remaining register positions will indicate that an entire character has been transmitted and the time is proper for calling for another 7 bit character from the input device.

In the receive mode of operation of the STR, register position N accepts the serially received 4 out of 8 data bits. Upon receipt of the first bit of the character, a tag is inserted in register position X of the register. After receipt of each data bit, the register 54 is read out through the core drivers 55 to the housekeeping plane 58 which contains a receiver temporary storage means. On each receive cycle the receiver temporary storage means is read out through the sense amplifiers 57 to the register 54. The receiver temporary storage means is effective to shift the previously received bits to the next preceding register position and the next following data bit is received at register position N. When an entire 8 bit character has been received, the tag originally inserted in register position X will be shifted through the register 54 and back to the register position CR indicating that the entire 8 bit character has been received. At this receive tag time the entire 4 out of 8 character will be read out of the register 54 through the core drivers 55 to a receive translator core plane 59. The 4 out of 8 transmittal code is translated to an output code by the receiver translator 59 and is read through the sense amplifiers 57 to the register 54 for presentation in parallel form as data output to an output device.

Control characters which may be transmitted and received by each STR are recognized in a control code analyzer 60 for causing certain STR functions and for changing the direction of transmission between the distant STR units.

A master oscillator 61 controls the entire operation of the STR. The oscillator pulses are applied to a cycle control unit 62 which is effective to interleave transmit and receive cycles of the STR. The cycle control 62 is effective to control transmit and receive clocks 63. The transmit clock is effective to control the transmitting bit rate of the STR. The receiving clock is effective to produce a receiving sample strobe pulse which is synchronized to the center of received data bits for sampling the presence or absence of a data bit in the time-position encoded character.

Figure 3:
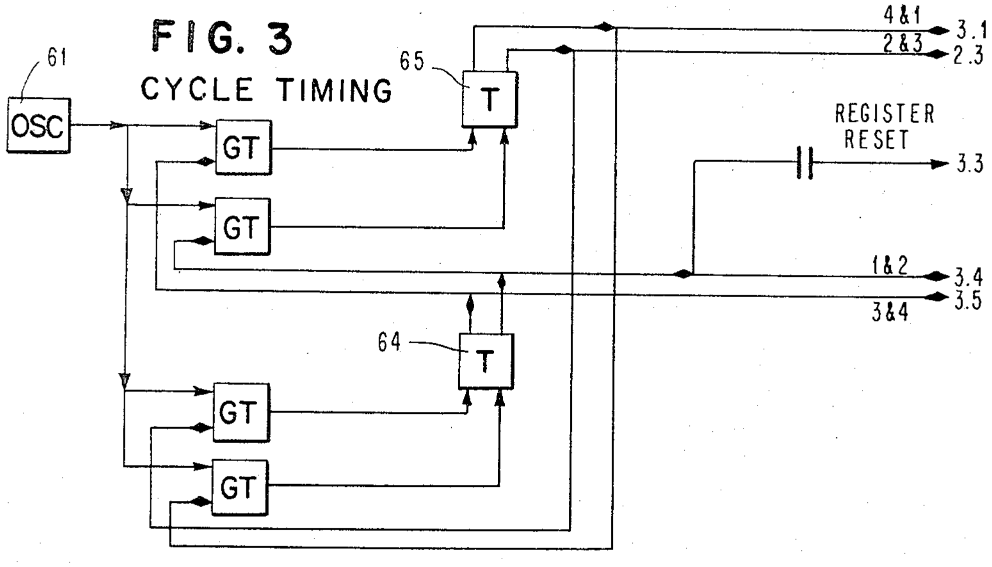
FIG. 3 is a logical block diagram showing the source of sub-cycle timings.

FIG. 3 shows the means by which basic timing in the STR is achieved. The oscillator 61 feeds pulses to input gates of a trigger 64 and a trigger 65. The triggers 64 and 65 are coupled in such a way that the ON side of trigger 64 gates the ON side of 65 and the OFF side of 64 gates the OFF side of 65. The ON side of trigger 65 gates the OFF side of trigger 64 and the OFF side of trigger 65 gates the ON side of trigger 64. In this manner, the stable state of trigger 65 changes to the same stable state as 64 one oscillator pulse later. Each of the triggers 64 and 65 completes a cycle of operation on the occurrence of 4 oscillator pulses. The register reset (RR) pulse 3.3 is generated every fourth oscillator pulse and coincides with the beginning of voltage level 3.4. (See FIG. 24.)

FIG. 4 shows the receiver clock which generates the receiver sampling strobe (RC STROBE) 4.1. The RC STROBE pulse 4.1 is normally generated upon applying 32 RR pulses 3.3 to a divider consisting of triggers 66, 67, 68, 69 and 70. Triggers 66 and 67 are cross-coupled in the same manner as triggers 64 and 65 in FIG. 3. Triggers 66 and 67 being cross-coupled will normally cause the ON side of trigger 66 to go from a negative level to a positive level on the occurrence of 4 RR pulses. The change of trigger 66 from OFF to ON will apply a positive pulse to a binary input of trigger 68 changing trigger 68 from the existing stable state to the opposite stable state. As each of the triggers 68, 69 and 70 change from OFF to ON, the next succeeding trigger is triggered from the existing stable state to an opposite stable state.

When the receive clock is to produce a RC STROBE 4.1 upon the occurrence of 32 RR pulses, the ADVANCE line 6.2 will be at a negative level and the RETARD input 6.1 will be at a positive level. In this condition, gates 71, 72, 73 and 74 will cause triggers 66 and 67 to function in the ordinary manner. The means by which the RC STROBE 4.1 can be advanced or retarded will be more fully explained later. The energization of either the ADVANCE line 6.2 or the RETARD line 6.1 will be effective to cause trigger 66 to change from the OFF condition to the ON condition, changing the stable state of trigger 68, upon the occurrence of 3 or 5 RR pulses 3.3.

A character is transmitted as a series of "1's" and "0's" representing mark and space conditions respectively of a 4 out of 8 code. Each character will have 4 mark bits and 4 space bits. It is essential that the RC STROBE pulse 4.1 be maintained in a definite time relationship with received data bits. Separate synchronizing pulses do not accompany each character transmitted. The present invention includes means by which the RC STROBE pulse 4.1 is maintained in the center of received bit signals. This is accomplished by causing a count to be made of the number of RR pulses 3.3 which occur during certain conditions. The count of RR pulses 3.3 is accumulated by counting the pulses starting with the leading edge of a received mark signal to the occurrence of the next RC STROBE pulse 4.1. To this first partial count is added a count of RR pulses 3.3 commencing with the trailing edge of a received mark signal to the occurrence of the next RC STROBE 4.1. When the RC STROBE 4.1 is exactly centered in each bit position, the count of RR pulses 3.3 will be exactly 32. When the RC STROBE 4.1 occurs before the center of received bits, the total count of RR pulses 3.3 will be less than 32. When the RC STROBE 4.1 occurs after the center of receive data bits, the total count of RR pulses will be greater than 32. This manner of counting to determine any deviation of the RC STROBE from the center of the received bits is unaffected by distortion of the received signal. If the received mark has been shortened during transmission, the first partial count will be somewhat less than normal but this will be compensated for because the trailing edge of the signal will occur earlier than normal and will cause the second partial count to be more than usual. Likewise, if the received mark signal should be lengthened, the first partial count will be greater than normal but the second partial count will be less than normal. If the RC STROBE 4.1 is centered within each received bit, the total count of pulses will be 32. (See FIG. 9.)

Figure 5:
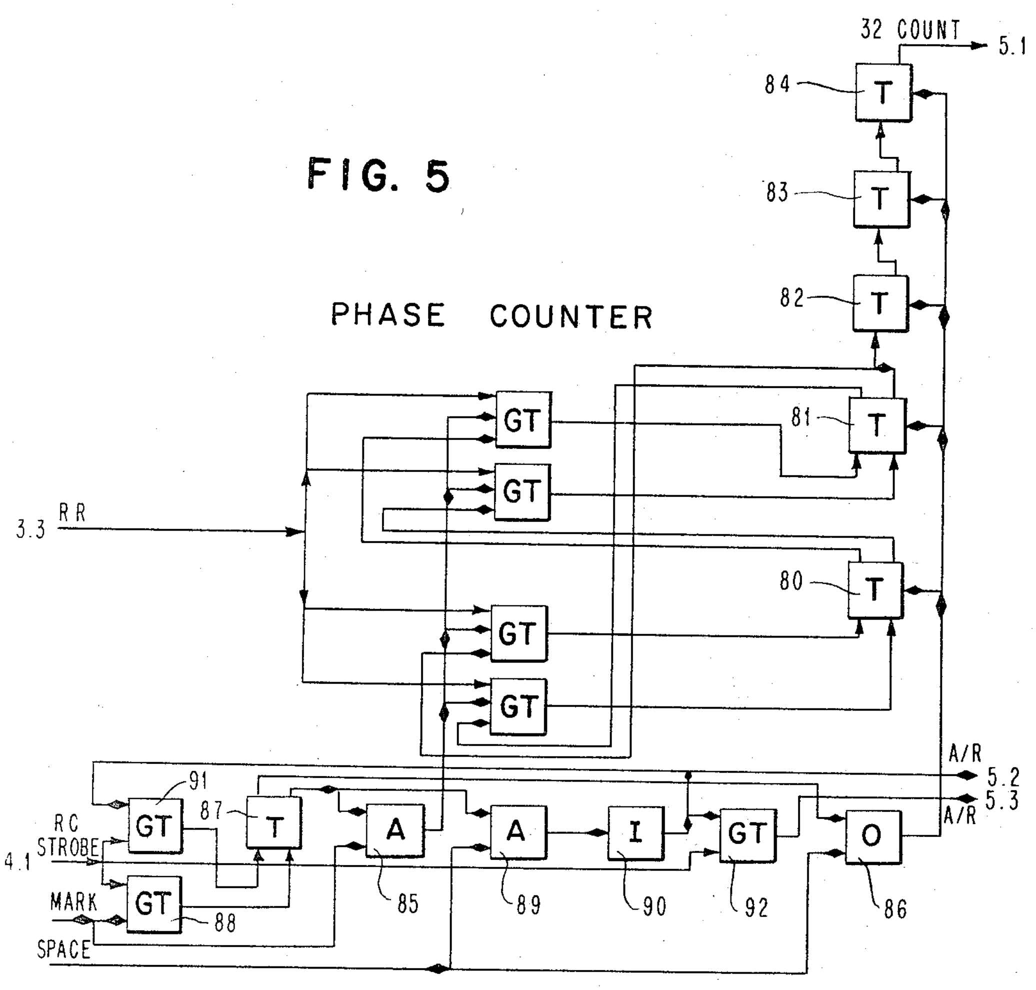
FIG. 5 is a logical block diagram showing the phase counter of the STR for determining the relative position of the receiver bit sampling strobe with the center of a received signal.

FIG. 5 shows the phase counter by which a first and second partial count of RR pulses 3.3 is accumulated. The counter consists of a series of triggers 80, 81, 82, 83 and 84. These triggers are effective to produce an output indicating a count of 32 from trigger 84 as it changes from the OFF to the ON condition. Triggers 80 and 81 are cross-coupled in a manner to produce a binary input to trigger 82 upon the occurrence of 4 RR pulses 3.3. The input gates of triggers 80 and 81 are conditioned by the triggers 80 and 81 in the manner previously discussed and in addition, are conditioned by the output of an AND circuit 85. During marking periods of a received character, the input from the de-modulator labeled MARK will be at a positive potential and the input labeled SPACE will be at a negative potential. For the period in which a SPACE is being received, the conditions will be reversed. During the initial condition when a SPACE is being received an OR circuit 86 will be conditioned by the SPACE signal and the positive level of the OFF side of trigger 87 producing a negative output level which causes the triggers 80 through 84 to be set in the ON condition. The negative output of OR circuit 86 will prevent RR pulses 3.3 from being counted. During this initial phase, AND circuit 85 will be producing a positive output level because both inputs are not positive. As soon as a MARK is received, the SPACE input will go to a negative level and the set output of OR circuit 86 will be removed. With the set removed from triggers 80 through 84, the triggers 80 and 81 will commence to count RR pulses 3.3 applied to their respective input gates.

The occurrence of the immediately following RC STROBE 4.1 during the MARK condition will energize gate 88 producing a positive pulse to the ON side of trigger 87. With the ON side of trigger 87 at a positive level in addition to the positive level of the MARK condition, AND circuit 85 will now produce a negative voltage level to the input gates of triggers 80 and 81 stopping their counting action. When the trailing edge of the MARK signal occurs and the SPACE input line goes to a positive level, the second partial count will be started. With the MARK input at a negative level and trigger 87 ON, AND circuit will produce a positive output to the input gates of triggers 80 and 81 and normal counting by triggers 80 and 81 will start again. With the SPACE input at a positive level and trigger 87 ON, an AND circuit 89 will be conditioned producing a negative output level which is inverted at inverter 90 to produce a positive level at a gate 91. The occurrence of the next RC STROBE 4.1 at gate 91 will produce a positive pulse to the OFF side of the trigger 87. When trigger 87 returns to the OFF condition during the duration of a SPACE, OR circuit 86 will be conditioned by two positive levels producing a negative level output applied to the triggers 80 through 84 to stop counting operation and to set all triggers to the ON stable state.

If the RC STROBE 4.1 were occurring at or after the center of received signals, trigger 84 would have produced a 32 COUNT pulse 5.1. If the RC STROBE 4.1 were occurring before the center of received MARK signals, trigger 84 would not have produced a 32 COUNT pulse 5.1 at the time the second partial count was stopped and the triggers reset.

A gate 92 conditioned by inverter 90 when its output is positive and the occurrence of the RC STROBE 4.1, which halts the second partial count, produces an A/R pulse output 5.3 the purpose of which will be explained later.

FIG. 6 shows the phase count responsive means which will indicate whether or not the phase counter had counted at least 32 RR pulses thereby bringing to a positive level the 32 COUNT output 5.1. Each time the phase counter of FIG. 5 counts more than 32 RR pulses, the 32 COUNT line 5.1 will turn ON a trigger 100. If the phase counter had not counted 32 RR pulses at the time of the RC STROBE 4.1, trigger 100 would not have been turned ON. The ON side of the trigger 100 conditions an OFF side gate of a trigger 101 and the OFF side of trigger 100 conditions an ON side gate of trigger 101. The ON side of trigger 101 in turn conditions the ON side of a trigger 102 and the OFF side of trigger 101 conditions the OFF side of trigger 102. The ON side of trigger 102 conditions a gate 103 which when conditioned will apply through OR circuit 104 a positive pulse to the ON side of a trigger 105. The OFF side of trigger 102 conditions a gate 106 which in turn applies a positive pulse to the OFF side of trigger 105 through an OR circuit 107.

Triggers 101, 102 and 105 are included in correcting means responsive to 3 consecutive deviations of the RC STROBE 4.1 from the center of received MARK signal. When triggers 101, 102 and 105 are all ON, an AND circuit 108 will have all its inputs positive producing a negative RETARD output 6.1. When the triggers 101, 102 and 105 are all OFF, an AND circuit 109 will have all its inputs positive producing a negative output level which is inverted by inverter 110 to produce ADVANCE level 6.2. For normal synchronization and correcting operations, the remaining two inputs to AND circuits 108 and 109 will be positive. The reason and operation of the remaining two inputs to AND circuits 108 and 109 will be more fully explained later.

The input gates of triggers 101 and 102 are additionally conditioned by A/R GATE input 5.2 which is at a positive level during a SPACE period during which time the second partial count is being accumulated in the phase counter of FIG. 5. This positive level is obtained from inverter 90 in FIG. 5. The pulse which causes triggers 101, 102, and 105 to change their stable states is obtained from gate 92 of FIG. 5 which produces an A/R PULSE output 5.3 upon the occurrence of the RC STROBE 4.1 which halts the second partial count.

The manner in which triggers 101, 102 and 105 are caused to assume the same stable state is shown in FIG. 7*a*. Gating of triggers 101, 102 and 105 is such that triggers 102 and 105 cannot change to a particular stable state until the next preceding trigger has changed to that stable state. Trigger 101 is conditioned to turn OFF only if trigger 100 has been turned ON by the 32 COUNT output 5.1. In a like manner, trigger 101 will not be turned ON by A/R PULSE 5.3 unless trigger 100 has remained OFF. The triggers, and in particular trigger 101, will not be turned ON or OFF unless the respective gates have been conditioned for a predetermined length of time. As a result, trigger 101 will never be turned OFF by A/R PULSE 5.3 if trigger 100 is turned ON by the 32 COUNT pulse 5.1 which coincides with the A/R PULSE 5.3 if the RC STROBE is occurring at the center of received bits.

In FIG. 7*a* triggers 100, 101, 102 and 105 may assume any initial state. Assume initially trigger 101 ON, 102 OFF, and 105 OFF. Also assume that alternate MARK-SPACE signals are being received such that a correction may be made every other RC STROBE 4.1. The numbered pulses represent A/R PULSE 5.3 which occurs every other RC STROBE 4.1. If the phase counter of FIG. 5 is counting more than 32 pulses, trigger 100 will be turned ON by 32 COUNT output 5.1. At the occurrence of A/R PULSE 5.3 number 1, trigger 101 will be conditioned to be turned OFF, 102 ON, and 105 will remain OFF. If at the occurrence of A/R PULSE number 2 trigger 100 has been turned ON, trigger 101 is already OFF and since 101 is OFF, trigger 102 will be conditioned to be turned OFF, and with trigger 102 ON initially, trigger 105 will be conditioned to be turned ON. The occurrence of the third consecutive A/R PULSE in which trigger 100 has been turned ON, all triggers 101, 102 and 105 will be turned OFF by A/R PULSE 5.3. With all triggers OFF, AND circuit 109 of FIG. 6 will be conditioned and ADVANCE output 6.2 will be generated. The affect of ADVANCE output 6.2 going to a positive level will be more fully disclosed later. With the ADVANCE line 6.2 at a positive level, a gate 111 of FIG. 6 will be conditioned and at the occurrence of SLAVE PULSE 4.2 going positive, trigger 105 will be turned ON through OR circuit 104. SLAVE PULSE 4.2 is generated in the receive clock of FIG. 4 when trigger 67 is changed from the ON to the OFF condition.

In FIG. 7*a* trigger 105 was turned OFF at 112 and turned back ON at 113. If the next succeeding count were again greater than 32, trigger 105 would again be conditioned and turned OFF by A/R pulse number 4 causing another advance cycle to occur in the receive clock. Trigger 105 is again caused to be turned ON at 114 following the fourth count.

It is now assumed that at the time of the fifth A/R PULSE the phase counter of FIG. 5 failed to reach a count of 32. Trigger 100 would have been left in its OFF condition. The OFF side of trigger 100 conditions trigger 101 to be turned ON. Trigger 101 is turned ON by A/R PULSE and since trigger 102 is OFF at this time trigger 105 will in turn be turned OFF. At the occurrence of the sixth A/R PULSE, if the count is again less than 32, trigger 100 will remain OFF, trigger 101 will remain ON, and with trigger 101 ON trigger 102 is conditioned to be turned ON and will be turned ON. At the occurrence of the third count of less than 32, shown as A/R PULSE number 7 in FIG. 7*a*, trigger 105 will be conditioned to be turned ON by trigger 102 and will turn ON. Thus immediately after the occurrence of the third consecutive count of less than 32 all triggers 101, 102 and 105 will be in the ON condition and gate 108 will have all its inputs positive producing a negative RETARD output 6.1. The affect of the negative RETARD output 6.1 on a receiver clock will be discussed later. The negative RETARD output 6.1 is inverted by an inverter 115 to a positive level at an AND circuit 116. The other A/R 3 OFF input 4.3 to the AND circuit 116 is produced in the receiver clock by the ON side of trigger 66. With both inputs positive to AND circuit 116, the inverted output will be positive and is applied to a gate 117. With gate 117 conditioned the next RR pulse 3.3 applied to gate 117 will apply a positive pulse through OR circuit 107 to the OFF side of trigger 105.

In FIG. 7*a* trigger 105 would have been turned ON at 118 and turned OFF at 119. If the next count of the phase counter were again less than 32 trigger 100 would have been OFF and through the conditioning of the remaining triggers, trigger 105 would have again been turned ON at 120.

A/R PULSES 9 and 10 in FIG. 7*a* represent a condition in which there is first a count of more than 32 and then a count of less than 32 respectively. Following through the conditioning of trigger 101, 102 and 105 will show that at no time will these triggers all be ON or all be OFF.

A/R PULSES 11 and 12 in FIG. 7*a* represent a condition in which the RC STROBE occurs at the same time the 32 COUNT output 5.1 is generated. In this case trigger 100 is turned ON to condition trigger 101 to turn OFF. A/R PULSE number 11 occurs at the same time trigger 100 turns ON, and occurs before the time needed to gate the OFF side of trigger 101 so that trigger 101 is not turned OFF. If trigger 101 had been OFF, it would have been gated to be turned ON by A/R PULSE number 11 and would have been turned ON. At A/R PULSE number 12 it is seen that even though the RC STROBE is occurring at the center, all the A/R triggers will be ON and a RETARD cycle will be caused. Trigger 100 is turned ON by the 32 COUNT pulse 5.1, but is not turned OFF until the next succeeding RC STROBE which occurs between A/R PULSES 11 and 12, and 12 and 13. A/R PULSES 13, 14 and 15 in FIG. 7*a* again show three consecutive occurrences of a greater than 32 count indicating that an advance correction should be made at 121.

It has been shown that the correction means including triggers 101, 102 and 105 is only effective on three consecutive count indications of the same sense. Line jitter will not affect synchronization.

Figure 8A:
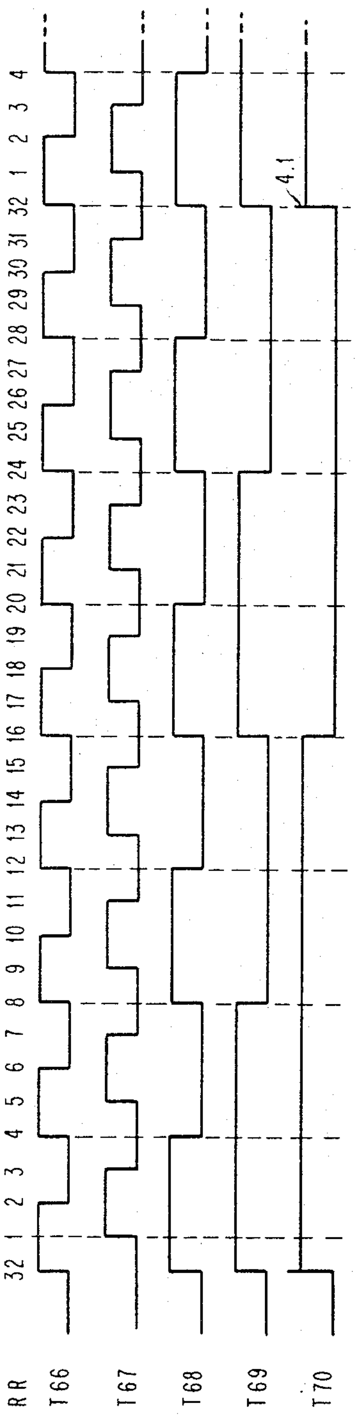

FIG. 8*a* shows the normal waveform of the ON side of triggers 66 through 70 in the receiver clock of FIG. 4. It can be seen that triggers 66 and 67, being cross-coupled are caused to change stable states normally upon the occurrence of every other RR pulse 3.3.

Figure 8B:
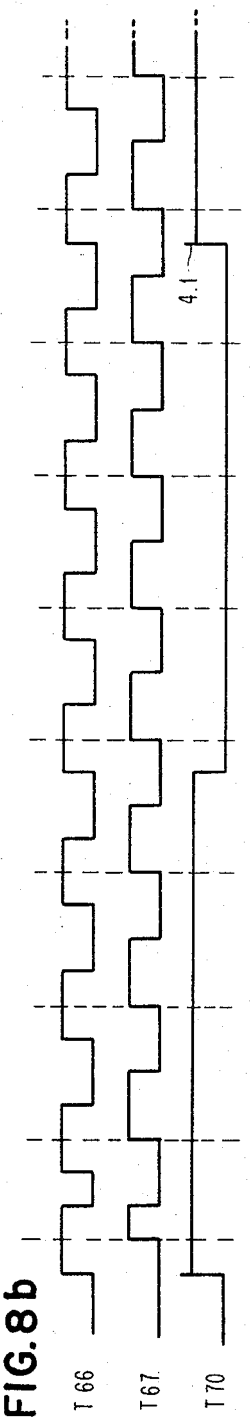

FIG. 8*b* shows the manner in which the RC STROBE 4.1 is caused to occur one RR pulse early. In this case, the advance/retard triggers 101, 102 and 105 have all been turned OFF producing a positive level on the ADVANCE output 6.2. The ADVANCE output 6.2 is applied to gate 75 in the receiver clock of FIG. 4. With gate 75 conditioned the next RR pulse 3.3 will cause a positive pulse to be applied through OR circuit 76 to the OFF side of trigger 67. In FIG. 8*b* it can be seen that trigger 67 has been caused to change from the ON condition to the OFF condition at the same time trigger 66 changed to the OFF condition. With trigger 67 turned OFF one pulse early trigger 66 will be turned ON at the occurrence of the third RR pulse instead of the fourth RR pulse. When trigger 67 is turned OFF SLAVE PULSE 4.2 is produced which is effective at gate 111 of FIG. 6 to turn ON trigger 105. (See FIG. 7*a* waveform of trigger 105 at 113.)

Figure 8C:
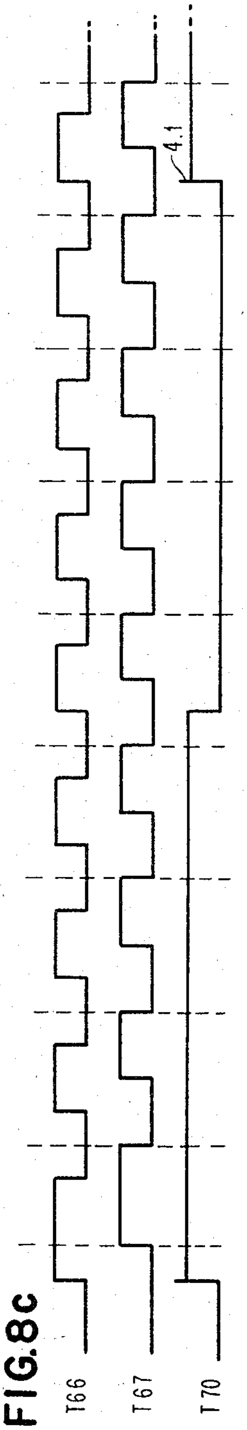

When trigger 101, 102 and 105 are all ON indicating that the RC STROBE is occurring early and should be retarded, the RETARD output 6.1 from AND circuit 108 in FIG. 6 will go to a negative level. The RETARD level 6.1 is applied to gate 72 in FIG. 4. The affect of this will be apparent from FIG. 8*c*. Trigger 66 would normally be turned OFF by RR pulse number 2 but the presence of the negative RETARD signal 6.1 at gate 72 prevents this RR pulse 3.3 from turning trigger 66 OFF. The RR pulse 3.3 labeled number 2 in FIG. 8*c* is effective however at gate 117 of FIG. 6 as the AND circuit output 116 is inverted to a positive level. This RR pulse 2 is effective to turn OFF trigger 105 through OR circuit 107. Turning trigger 105 OFF deconditions AND circuit 108 and returns the RETARD output 6.1 to the positive level allowing the next RR pulse 3.3 to turn trigger 66 OFF. It is apparent then at FIG. 8*c* that trigger 66 is caused to be turned ON upon the occurrence of 5 RR pulses rather than 4 RR pulses. The net effect of this is to cause the next receive strobe 4.1 to occur after 33 RR pulses.

Line jitter in received signals may cause receive strobe corrections but for the fact three consecutive deviations in the same direction are necessary to cause a correction to be made. Thus if signals are jittering back and forth, triggers 101, 102 and 105 will never assume the same stable state to cause a correction. Only when signals are received properly and the RC STROBE 4.1 starts to drift from the center of the received bits will corrections be made. Synchronization of a receiver sampling strobe with the transmitted bit rate of a distant transmitter is thus achieved without the need for time consuming and inefficient insertion of synch pulses in data signals.

FIG. 9 shows the transmit clock which produces a TR STROBE pulse 9.1 which controls the transmitted bit rate. The transmit clock consists of a series of five triggers 125, 126, 127, 128 and 129. Triggers 125 and 126 are cross-coupled as previously discussed such that the ON side of trigger 125 will produce a positive-going output upon the occurrence of every fourth RR pulse 3.3. As mentioned previously in the introduction, when a half-duplex mode of operation is in effect, a single oscillator controls the transmitting STR bit rate, the receiving STR receiver sample strobe synchronization and the receiving STR replying bit rate. The STR which is to transmit a record will be in the MASTER condition, and the receiving STR will be in the SLAVE condition. The transmitting STR when in the MASTER condition will have the MASTER line in FIG. 9 at a positive level and the SLAVE line at a negative level. In this manner, triggers 125 and 126 control the turning ON and OFF of trigger 127 through its input gates 130 and 131 condition by the MASTER input. At the receiving STR the SLAVE input will be at a positive level and the MASTER input at a negative level. In this case the SLAVE input at a positive level conditions the input gates 132 and 133 of trigger 127. In this condition every fourth RR pulse 3.3 which produces a positive-going level at the ON side of trigger 125 will have no affect on trigger 127. Trigger 127 of the receiving STR will be triggered either ON or OFF upon the occurrence of SLAVE PULSE 4.2. SLAVE PULSE 4.2 is produced by the receiving STR receiver clock. (See FIG. 4.) The SLAVE PULSE 4.2 is produced when the trigger 67 in the receiver clock of FIG. 4 is turned OFF and this occurs every fourth RR pulse in the receiving STR unless the receiver clock in the receiving STR has been affected by the advance or retard condition. In this manner, the TR STROBE 9.1 in the receiving STR is caused to vary in accordance with corrections made in the receiving clock of the receiving STR, thus maintaining synchronism with the master oscillator of the transmitting STR which is in turn controlling its receiving station.

Means for synchronizing a receiving unit with the received bits has been shown which does not require the transmission of time consuming and inefficient synchronizing bits. Synchronization has been shown to be maintained by utilizing only data bits transmitted between the units. The synchronizing means shown is capable of maintaining synchronism although the signals transmitted may be distorted or caused to jitter on the line. Corrections in the synchronization are not made on each deviation from the standard, but are only made when the receiving STR recognizes a consecutive number of the same type of deviation.

While the invention has been particularly shown and described with reference to a preferred embodiment thereof, it will be understood by those skilled in the art that various changes in form and details may be made therein without departing from the spirit and scope of the invention.

We claim:

1. Apparatus for maintaining a receiver data bit sampling strobe in the center of transmitted data bit signals having a predetermined bit rate and time relationship to represent data characters comprising, a source of input pulses, frequency divider means for receiving said input pulses to normally generate said strobe pulse after a predetermined number of input pulses equal to the bit rate of said data bit signals, a plural stage counting means adapted to selectively count said input pulses, count controlling means responsive to said received data bit signals and said strobe pulses for causing said counter to count said input pulses during a portion of a mark signal and a portion of a space signal, means responsive to said counting means for indicating the relative position of said strobe pulses to said received data bit signals, and correcting means responsive to said count responsive means for selectively advancing the strobe output of said divider means with respect to the normal output.

2. Apparatus for maintaining a receiver data bit sampling strobe in the center of transmitted data bit signals having a predetermined bit rate and time relationship to represent data characters comprising, a source of input pulses, frequency divider means for receiving said input pulses to normally generate said strobe pulse after a predetermined number of input pulses equal to the bit rate of said data bit signals, a plural stage counting means adapted to selectively count said input pulses, count controlling means responsive to said received data bit signals and said strobe pulses for causing said counter to count said input pulses during a portion of a mark signal and a portion of a space signal, means responsive to said counting means for indicating the relative position of said strobe pulses to said received data bit signals, and correcting means responsive to said count responsive means for selectively retarding the strobe output of said divider means with respect to the normal output.

3. Apparatus for maintaining a receiver data bit sampling strobe in the center of transmitted data bit signals having a predetermined bit rate and time relationship to represent data characters comprising, a source of input pulses, frequency divider means including a plurality of bistable devices for receiving said input pulses for normally generating said strobe pulse after a predetermined number of input pulses equal to the bit rate of said data bit signals, a plural stage counting means adapted to selectively count said input pulses, count controlling means responsive to the start of a received data bit signal to cause said counting means to count said input pulses and responsive to the immediately following one of said strobe pulses for blocking further count, said controlling means also responsive to the end of said received data bit signal to cause said counter to continue counting said pulses, and responsive to another immediately following one of said strobe pulses for stopping and resetting said counter, count responsive means operative at the occurrence of the second strobe pulse for indicating the relative position of said strobe pulses to said received data bit signals, and correcting means responsive to said count responsive means for selectively advancing or retarding the strobe output of said divider means with respect to the normal output.

4. Apparatus in accordance with claim 3 wherein said counting means includes output means for producing a pulse on the occurrence of said predetermined number of said input pulses.

5. Apparatus in accordance with claim 4 wherein said count responsive means includes a bistable device responsive to said counter output pulse for changing from a first stable state to a second stable state, whereby said bistable device will indicate that said counter had counted less than or at least said predetermined number of said input pulses.

6. Apparatus in accordance with claim 5 wherein said correcting means includes a plurality of bistable devices, responsive to at least a predetermined number of consecutive first stable states of said count responsive means, for assuming a stable state opposite to said first stable state, and means connected to one of said bistable devices in said divider means, conditioned by said plurality of correcting bistable devices when in said opposite stable state, for preventing one of said input pulses to said divider bistable device from changing the stable state of said device, whereby said strobe pulse is generated on the occurrence of one more than said predetermined number of said input pulses.

7. Apparatus in accordance with claim 5 wherein said correcting means includes a plurality of bistable devices, responsive to at least a predetermined number of consecutive second stable states of said count responsive means, for assuming a stable state opposite to said second stable state, and means connected to one of said bistable devices in said divider means, conditioned by said plurality of correcting bistable devices when in said opposite stable state, for causing said divider bistable device to change stable states one input pulse before normal, whereby said strobe pulse is generated on the occurrence of one less than said predetermined number of said input pulses.

8. A pulse divider comprising, a source of input pulses, a first bistable device capable of assuming a first or second stable condition, a second bistable device capable of assuming a first or second stable condition, input means for each of said devices for receiving said pulses, said first and second stable condition of said first device conditioning said input means of said second device to cause said second device to assume said first and second stable condition respectively, and said first and second stable condition of said second device conditioning said input means of said first device to assume said second and first stable condition respectively, output means for producing a pulse from at least one of said bistable devices when said one device changes from a predetermined one of said stable conditions to the other stable condition, said output pulse normally occurring every fourth one of said input pulses, means connected to said input means of said first device for selectively preventing one of said input pulses from changing said first device to said second stable condition, and means connected to said input means of said second device for selectively causing said second device to assume said second stable condition at the same time said first device assumes said second stable condition, whereby said output pulse may be selectively produced upon the occurrence of three, four, or five input pulses.

9. A system for generating clock pulses comprising:

means for receiving binary information signals having a predetermined bit rate;

means for producing a clock signal nominally at said predetermined bit rate;

deviation indicating means responsive to said received information signals and said clock signal for indicating the sense of deviation, if any, of said clock signal from a predetermined relationship with said binary information signals;

and counting means connected to said deviation indicating means for producing a first or a second signal after a predetermined number of consecutive deviations in a first or second sense respectively.

10. A system in accordance with claim 9 wherein said counting means includes:

a plurality "$n$" of bistable devices having set and reset input gates;

the set and reset gates of a first of said bistable devices being connected to said deviation indicating means and adapted to set or reset said first bistable device in accordance with the sense of deviation indicated, the set and reset gates of each succeeding one of said bistable devices being connected to the set or reset output respectively of a preceding one of said bistable devices, whereby $n$ consecutive deviations in a first sense is effective to set all of said bistable devices and $n$ consecutive deviations in a second sense is effective to reset all of said bistable devices;

and gating means connected to the outputs of all said bistable devices for producing said first or second signal in response to the set or reset condition respectively of all said bistable devices.

11. A system in accordance with claim 10 wherein said clock signal producing means includes:

means connected to said gating means and responsive to said first or second signal to respectively advance or retard said clock signal by a predetermined increment of said predetermined bit rate.

No references cited.

ROBERT L. GRIFFIN, *Primary Examiner.*

R. L. RICHARDSON, *Assistant Examiner.*